(12) United States Patent
Scribner

(10) Patent No.: US 10,588,392 B2
(45) Date of Patent: Mar. 17, 2020

(54) FIBER DETANGLER

(71) Applicant: Knotty Tamer LLC, Costa Mesa, CA (US)

(72) Inventor: Patricia Ann Louise Scribner, Costa Mesa, CA (US)

(73) Assignee: Knotty Tamer LLC, Costa Mesa, CA (US)

( * ) Notice: Subject to any disclaimer, the term of this patent is extended or adjusted under 35 U.S.C. 154(b) by 0 days.

(21) Appl. No.: 15/721,527

(22) Filed: Sep. 29, 2017

(65) Prior Publication Data

US 2018/0092447 A1    Apr. 5, 2018

Related U.S. Application Data

(60) Provisional application No. 62/402,548, filed on Sep. 30, 2016.

(51) Int. Cl.
```
A45D 24/30      (2006.01)
A45D 24/04      (2006.01)
A01K 13/00      (2006.01)
```
(52) U.S. Cl.
CPC ............ *A45D 24/04* (2013.01); *A01K 13/002* (2013.01)

(58) Field of Classification Search
CPC ........ A45D 24/00; A45D 24/04; A45D 24/12; A45D 24/14; A45D 24/38;
(Continued)

(56) References Cited

U.S. PATENT DOCUMENTS

| D258,541 S | 3/1981 | Featherstone |
| 6,450,980 B1 * | 9/2002 | Robbins ................. A61H 7/003 |
| | | 601/136 |

(Continued)

FOREIGN PATENT DOCUMENTS

| GB | 2540555 A | 1/2017 |
| GB | 2544344 A | 5/2017 |
| WO | 2004000196 A1 | 12/2003 |

OTHER PUBLICATIONS

"Head Scalp Neck Handy Massage Octopus Massager Headache Stress Relief—Blue." EBay.com, Sep. 2, 2016. www.ebay.comlitm/ HEAD-SCALP-NECK-HANDY-MASSAGE-OCTOPUS-MAS-SAGER-HEAOACHE-STRESS-RELIEFBLUE/131888873065?_trkparms=aid%3D222007%26algo%3DSIM.MBE%26ao%3D1%26asc%302016090811 0712%26meid%3Dd35f58747139444abd5703cac312724fOk26pid%30100677%26rk%3D7%26rkt%3030%26sd%3D322419851326&_trksid=p2385738.c1 00677. m4598.

(Continued)

*Primary Examiner* — Rachel R Steitz
(74) *Attorney, Agent, or Firm* — Patent Law Works LLP

(57) ABSTRACT

The novel detangling innovations disclosed include a detangling device comprising a handle having an upper portion and a lower portion, and a plurality of arced tines. The plurality of arced tines are connected to the lower portion of the handle along a first periphery extending around the lower portion of the handle. The arced tines arc inwardly with respect to a center of the lower portion of the handle. An arced tine comprises an arced flexible member; a base situated at a proximal end of the arced flexible member, and a tip. The base is connected to the lower portion of the handle. The tip is situated at a distal end of the arced flexible (Continued)

member. The arced flexible member has an elongated arced profile between the base and the tip.

12 Claims, 16 Drawing Sheets

(58) Field of Classification Search
CPC ............. A45D 2024/005; A46B 9/023; A46B 2200/104; A01K 13/002; A01K 13/00; A61H 2201/1253; A61H 2205/021
USPC ........................................................ 294/19.2
See application file for complete search history.

(56) References Cited

U.S. PATENT DOCUMENTS

| | | | | |
|---|---|---|---|---|
| 7,186,228 | B2* | 3/2007 | Friedland | A61H 7/003 601/133 |
| D675,374 | S | 1/2013 | Bishop et al. | |
| 2002/0049400 | A1 | 4/2002 | Lacey | |
| 2005/0020943 | A1 | 1/2005 | Friedland | |
| 2011/0088188 | A1 | 4/2011 | Ghodsi | |
| 2012/0121313 | A1* | 5/2012 | Thiebaut | A61H 7/003 401/195 |
| 2017/0020276 | A1 | 1/2017 | Brewer et al. | |

OTHER PUBLICATIONS

International Search Report and Written Opinion, PCT/US17/54622, dated Jan. 9, 2018 (10 pages).
Amazon.com, Vinmax 3D Round Hair Brush, retrieved from https://www.amazon.com/dp/B076DS1NSJ/ref=asc_df_B076DS1NSJ5332895/?tag=hypro Jan. 11, 2018 (6 pages).
Amazon.com, Hair and Wig Pick—Great for Curly Hair and Wigs, retrieved from https://www.amazon.com/hair-wig-pick-great-curly-wigs/dp/B01GD7ZM8i Jan. 11, 2018 (6 pages).
Claire's Mint Chrome Handleless Detangling Hairbrush, retrieved from http://www.claires.com/us/mint-chrome-handleless-detangling-hairbrush-135898.html?pid=135898 Jan. 11, 2018 (4 pages).
Newchic, Portable Rainbow Brush Comb Hair Care Styling Massage HairBrush Anti-static Detangling, retrieved from https://www.newchic.com/brushes-and-combs-4154/p-1186827.html?rmmds=category Jan. 11, 2018 (7 pages).
Pick6Deals, Annie 3 in 1 Comb Small, retrieved from http://www.pick6deals.com/annie-3-in-1-comb-small.html Jan. 11, 2018 (4 pages).
Sephora, Tangle Teezer Thick & Curly Detangling Hairbrush, retrieved from https://www.sephora.com/product/thick-curly-detangling-hairbrush-P408415?skuId=1829795&om_mmc=ppc-GG_381463959_27499884639_pla-179482151835_1829795_97594837959_9029753_c&country_switch=us&lang=en&gclid=EAIaIQobChMIn8ad1uiW1gIVmYSzCh3Ygg-kEAkYAyABEgKyW_D_BwE&gclsrc=aw.ds Jan. 11, 2018 (2 pages).
International Preliminary Report on Patentability of Application No. PCT/US2017/054622, dated Apr. 11, 2019, p. 1-9.
Octopus massager, https://www.aliexpress.com/i/32894300068.html?spm=2114.12057483.0, Obtained from AliExpress.com on Feb. 14, 2019.

* cited by examiner

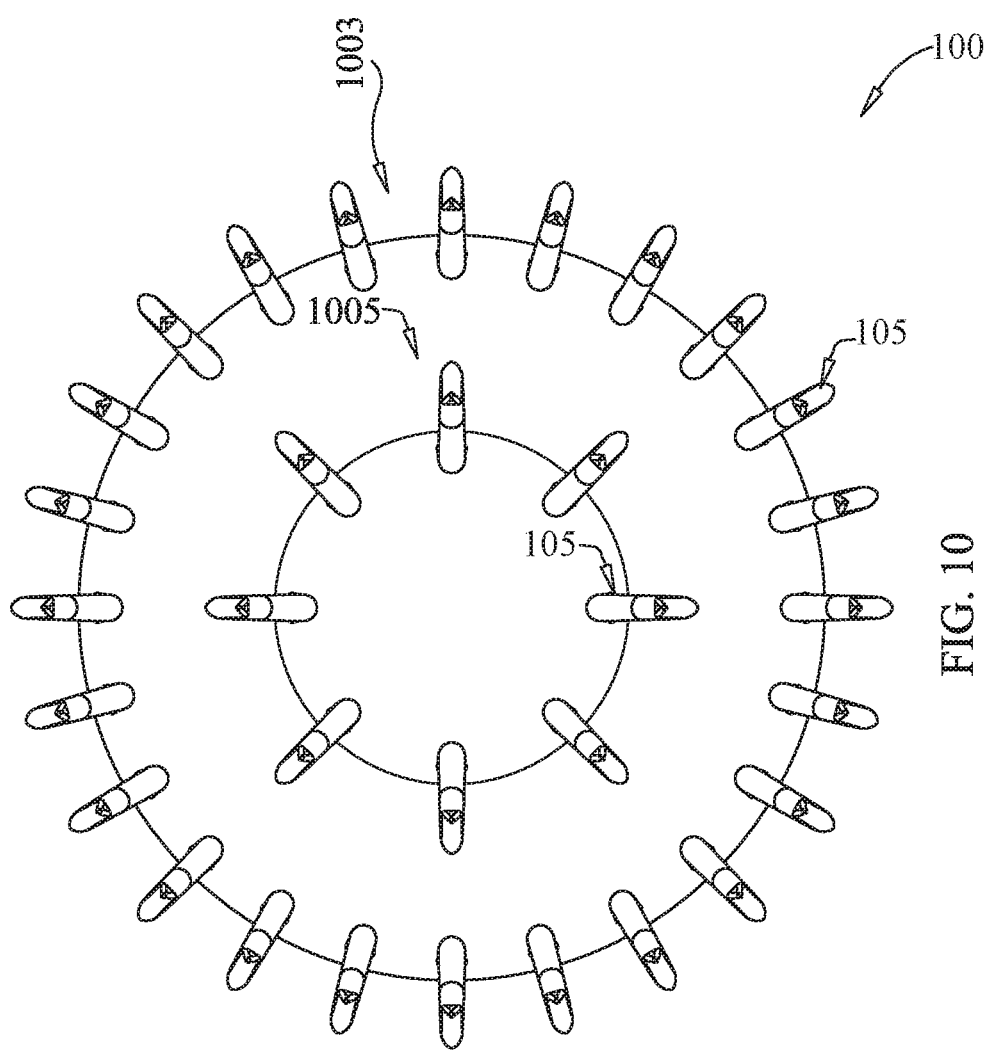

Forming handle having upper portion and lower portion
1501

Forming plurality of arced tines connected to lower portion of handle along first periphery extending around lower portion of handle, arced tines arcing inwardly with respect to center of lower portion of handle
1502

FIG. 15

FIBER DETANGLER

CROSS-REFERENCE TO RELATED APPLICATION

This application claims the benefit under 35 U.S.C. § 119(e) of U.S. Provisional Application No. 62/402,548, entitled "A Device Used for Detangling and Removing Knots and Tangles from Hair", filed on Sep. 30, 2016, the entire contents of which are incorporated herein by reference.

TECHNICAL FIELD

The present disclosure relates to fiber detanglement.

BACKGROUND

Various types of fibers can often tangle easily and be difficult to untangle without damaging the fibers. This is particularly common in haircare, where curly or dry hair can tangle easily. Many detangling options that do exist are either ineffective or have significant tradeoffs.

One such option is a comb or hair pick, which is a rigid, flat comb that has inflexible, widely spaced in-line teeth. When used to detangle fibers such as hair, the hair pick typically further compacts the tangle, which often and results in the person combing the hair using so much force that the hair breaks and/or frays and the tangle tears out.

Another such option a brush-like detangler, which has thin, brush-like bristles (e.g., extruded) that are arranged in a conventional array (uniform pattern and spacing, with shorter bristles) and merely tug and pull fibers, but are not substantial enough to work through a tangled bunch of fibers and are overly time consuming to use. Further, with frequent use, these types of bristles tend to deform, thus rendering them even more ineffective.

Some solutions use chemicals to detangle and relax hair. However, the chemicals used can carry a toxic smell and be harsh on the fibers and skin that are subject to treatment. This can result in dry hair and skin irritation among other adverse effects. Some less aggressive, purported nature or organic treatments can be less effective, particularly on larger, more aggressive tangles, and can be too time consuming to use regularly.

SUMMARY

According to one innovative aspect of the subject matter being described in this disclosure, a detangling device comprises a handle having an upper portion and a lower portion, and a plurality of arced tines. The plurality of arced tines are connected to the lower portion of the handle along a first periphery extending around the lower portion of the handle. The arced tines arc inwardly with respect to a center of the lower portion of the handle. An arced tine comprises an arced flexible member; a base situated at a proximal end of the arced flexible member, and a tip. The base is connected to the lower portion of the handle. The tip is situated at a distal end of the arced flexible member. The arced flexible member has an elongated arced profile between the base and the tip.

In general, another innovative aspect of the subject matter described in this disclosure may be embodied in a fiber detangler manufacturing method that comprises forming a handle having an upper portion and a lower portion; and forming a plurality of arced tines connected to the lower portion of the handle along a first periphery extending around the lower portion of the handle. The arced tines arc inwardly with respect to a center of the lower portion of the handle. An arced tine comprises an arced flexible member; a base situated at a proximal end of the arced flexible member; and a tip situated at a distal end of the arced flexible member. The base is connected to the lower portion of the handle, and the arced flexible member has an elongated arced profile between the base and the tip.

Other innovative aspects include corresponding apparatuses, systems, methods, processes, etc. These and other implementations may include one or more of the following additional features: that each arced tine of the plurality of arced tines is tapered from the base to the tip; that a thickness of each arced tine proximal the base is thicker than a thickness of the arced tine proximal the tip; that the arced flexible member has a stronger tine resistance when flexed outwardly than inwardly; that the lower portion of the handle comprises a plurality of tine retainers situated proximal to the first periphery; that the base of each arced tine of the plurality of arced tines is coupled to a corresponding tine retainer of the plurality of tine retainers; that the plurality of arced tines and the lower portion of the handle are integral; that the first periphery comprises a peripheral surface that extends along a circular path around the lower portion of the handle; that the arced flexible member of each arced tine of the plurality of arced tines is comprised of a material having a torsional modulus of elasticity such that when the handle is twisted 360 degrees; that the arced flexible member of each arced tine is twistable at least 90 degrees between the base and the tip without permanent deformation; that the fibers comprise one of hair and fur; that the handle and the plurality of arced tines are injection molded; that the handle and the plurality of arced tines are integral; that forming the plurality of arced tines connected to the lower portion of the handle further comprises forming each of the plurality of arced tines as individual members, and securely attaching the base of each of the plurality of arced tines to a corresponding tine holder included in the lower portion of the handle; that forming the handle having the upper portion and the lower portion further comprises forming, as the lower portion, a first housing including a cavity, an interior surface of the first housing including a plurality of tine holders configured to hold the plurality of arced tines, respectively, and mating the base of each arced tine of the plurality of arced tines with a corresponding tine holder of the plurality of tine holders, the base being shaped to compatibly mate with the corresponding tine holder; that the first housing includes a plurality of tine apertures and the manufacturing method further comprises passing the tip of each arced tine through a corresponding tine aperture of the plurality of tine apertures in conjunction with mating the base of each arced tine with the corresponding tine holder; that forming the handle having the upper portion and the lower portion further comprises forming, as the upper portion, a second housing including a plurality of tine retainers along a lower handle attachment region, the plurality of tine retainers protruding outwardly from the lower handle attachment region, and coupling the second housing with the first housing such that the plurality of tine retainers protrude into the cavity of the first housing and couple with the plurality of tine holders to cooperatively secure the plurality of arced tines in place.

It should understood that the above list is not exhaustive and further features and aspects are possible and contemplated, as described elsewhere herein.

These detangling apparatuses, methods, systems, and other aspects are particularly advantageous in a number of respects. For example, the various example embodiments described herein can detangle fibers, such as hair, with less resistance, less breakage, and quicker detangling than current solutions, such those described in the background. Further, these embodiments can be used on sensitive, wet, or dry hair.

However, this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

FIG. 10 depicts a rear view of another example detangling device.

FIG. 15 depicts a flowchart of an example detangler manufacturing process.

DETAILED DESCRIPTION

Figure 1:
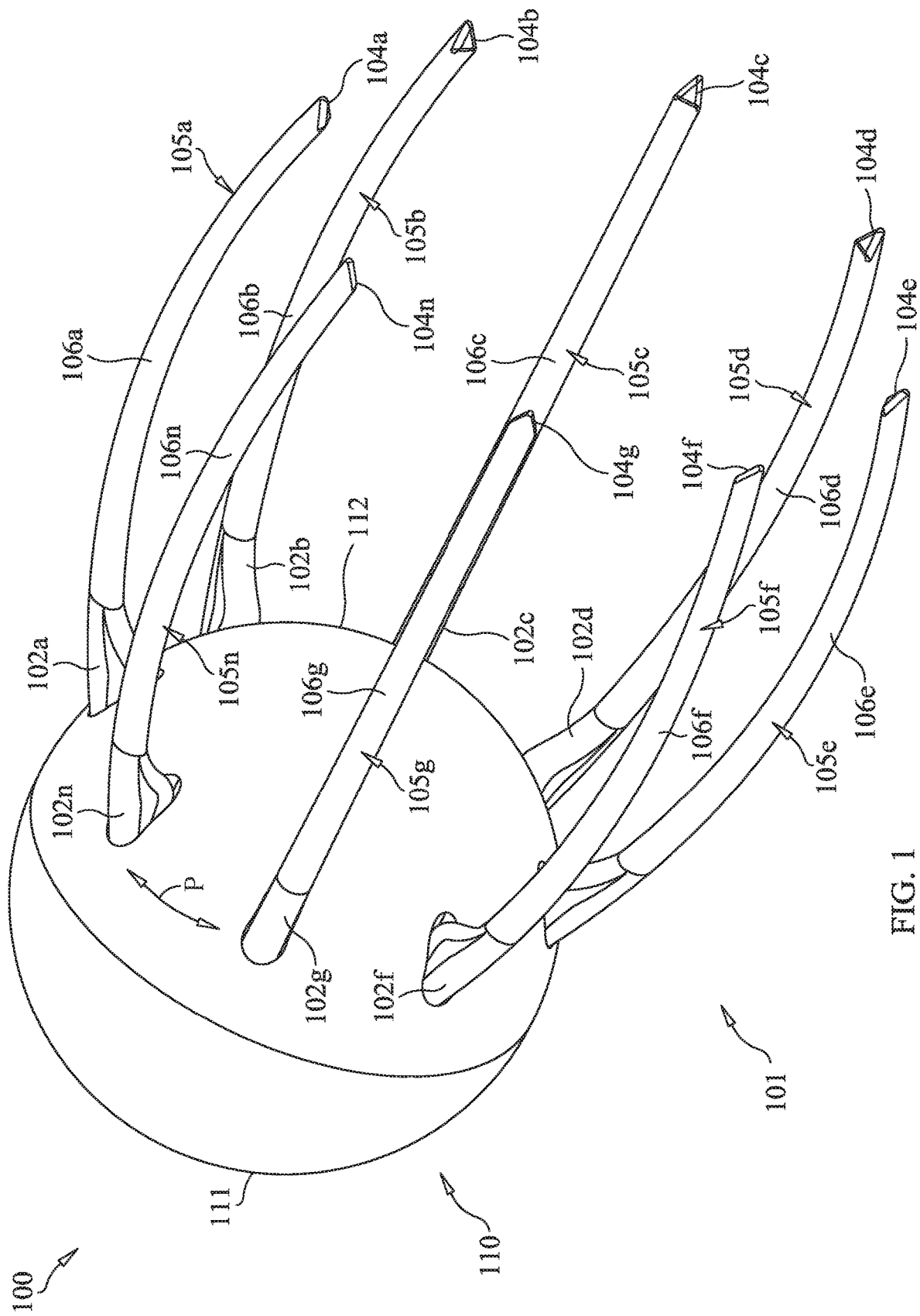
FIG. 1 depicts a rear perspective view of an example detangler.
Figure 2:
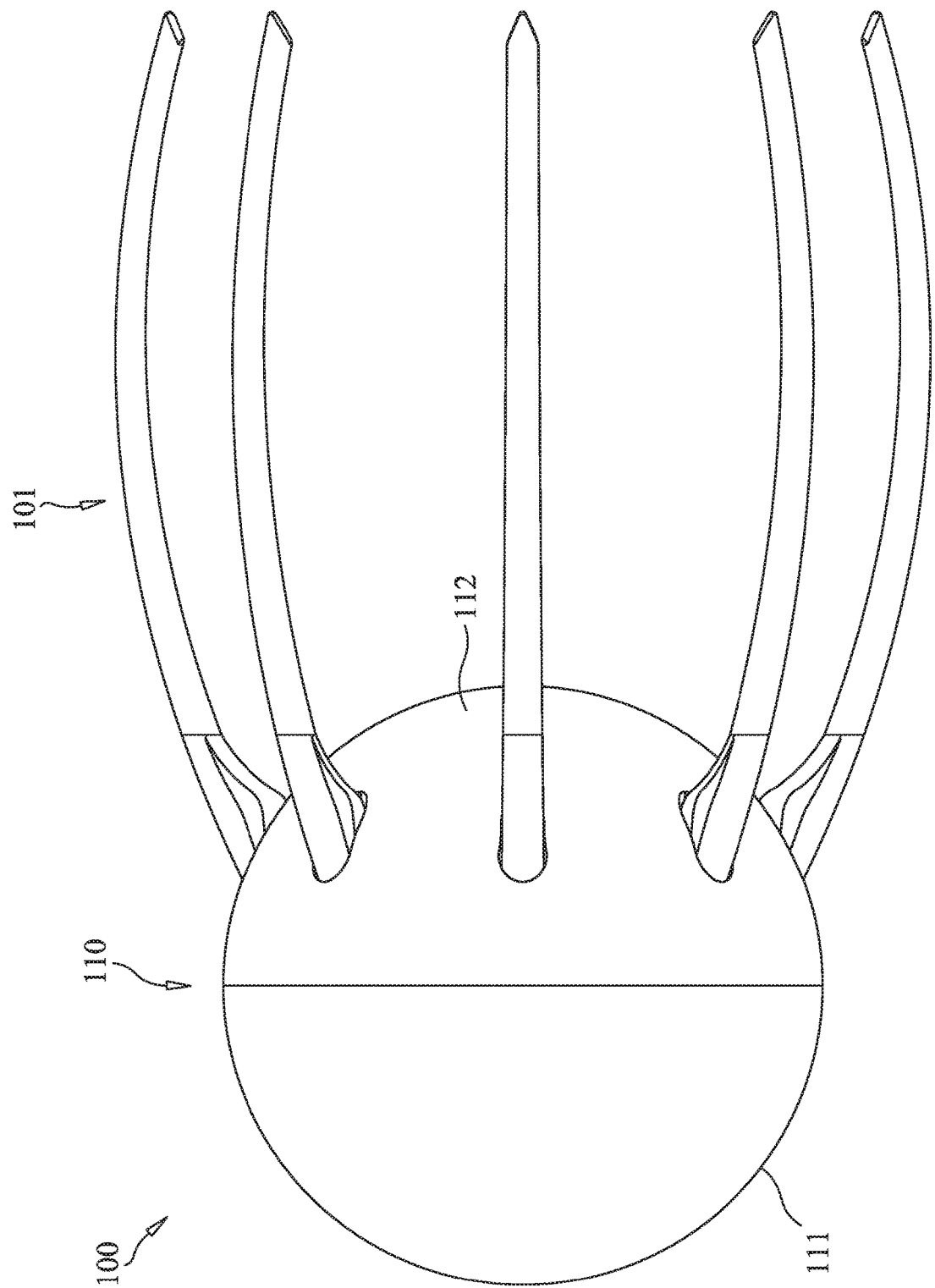
FIG. 2 depicts a left view of the example detangler (the right view being a mirror image of the left view).
Figure 3:
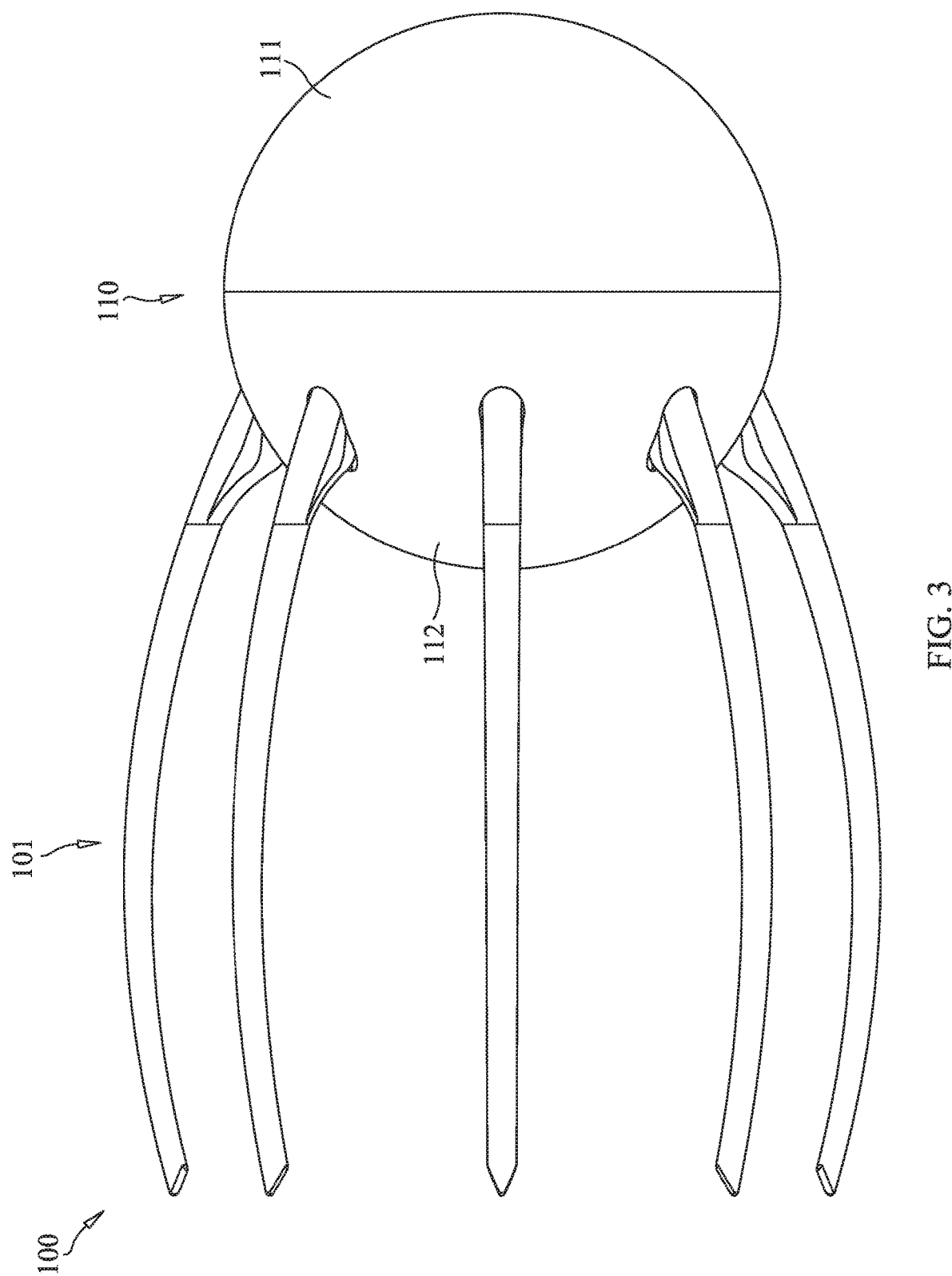
FIG. 3 depicts a top view of the example detangler (the bottom view being a mirror image of the top view).

This application discloses innovative fiber detanglers, fiber detanglement processes, methods of manufacturing fiber detanglers, and other related aspects.

FIGS. 1-5 depicts various views of an example detangling device 100, which is also referred to herein as a detangler or a fiber detangler. With respect to these and other reviews, like reference numbers are used to refer to like elements, and every view does not necessarily include every single reference number so as not to obfuscate what is being depicted. However, when viewed collectively across applicable views, all reference numbers described herein are clearly depicted and adequately described herein.

As shown, in FIGS. 1-5, an example detangling device 100, which is also referred to herein as a detangler or fiber detangler, comprises a handle 110 and the detangling mechanism 101. The handle 110 may include an upper portion 111 via which the user may grip and/or hold the detangling device 100. The handle 110 may include a lower portion 112. The lower portion 112 may include and/or be coupled to the detangling mechanism 101. Example non-limiting dimensions of a handle may include a 2 inch sphere, although should be understood that any suitably dimensioned handle is possible and contemplated. For example any applicable dimensions that allow for gripping and are holding by a machine or user may be suitable. The sphere may be injection molded may be comprised of two or more portions, such as two halves, although it should be understood that this example is non-limiting and that various other manufacturing methods may be used for some or all of the components described herein (e.g., extruding, 3D printing, milling, cutting, etc.), and that numerous other configurations and arrangements are also possible and contemplated.

The depicted handle 101 has a spherical shape that allows for convenient gripping of the detangler by user, such as but not limited to a stylist styling hair of another, or a person styling their own hair. In further embodiments, the handle 101 may have other suitable shapes, such as an oval shape, a square shape, a complex shape (e.g., polygonal, smooth complex curvatures, etc.). In some embodiments, the handle includes a gripping protrusion that protrudes perpendicularly outwardly relative to the detangling mechanism 101, a gripping protrusion that protrudes upwardly perpendicularly away from the detangling mechanism 101, etc. Other suitable configurations are also possible and contemplated.

The detangling mechanism 101 may comprise a plurality of arced tines 105, such as the arced tines 105a . . . 105n. While in the depicted embodiment, the detangling mechanism 101 includes eight arced tines 105, it should be understood that any suitable number of arced tines may be included. For example, some detanglers may include anywhere from 3 to 30 or more tines, which may be laid out in a single pattern or plurality of the same or different patterns, as discussed elsewhere herein.

Figure 7:
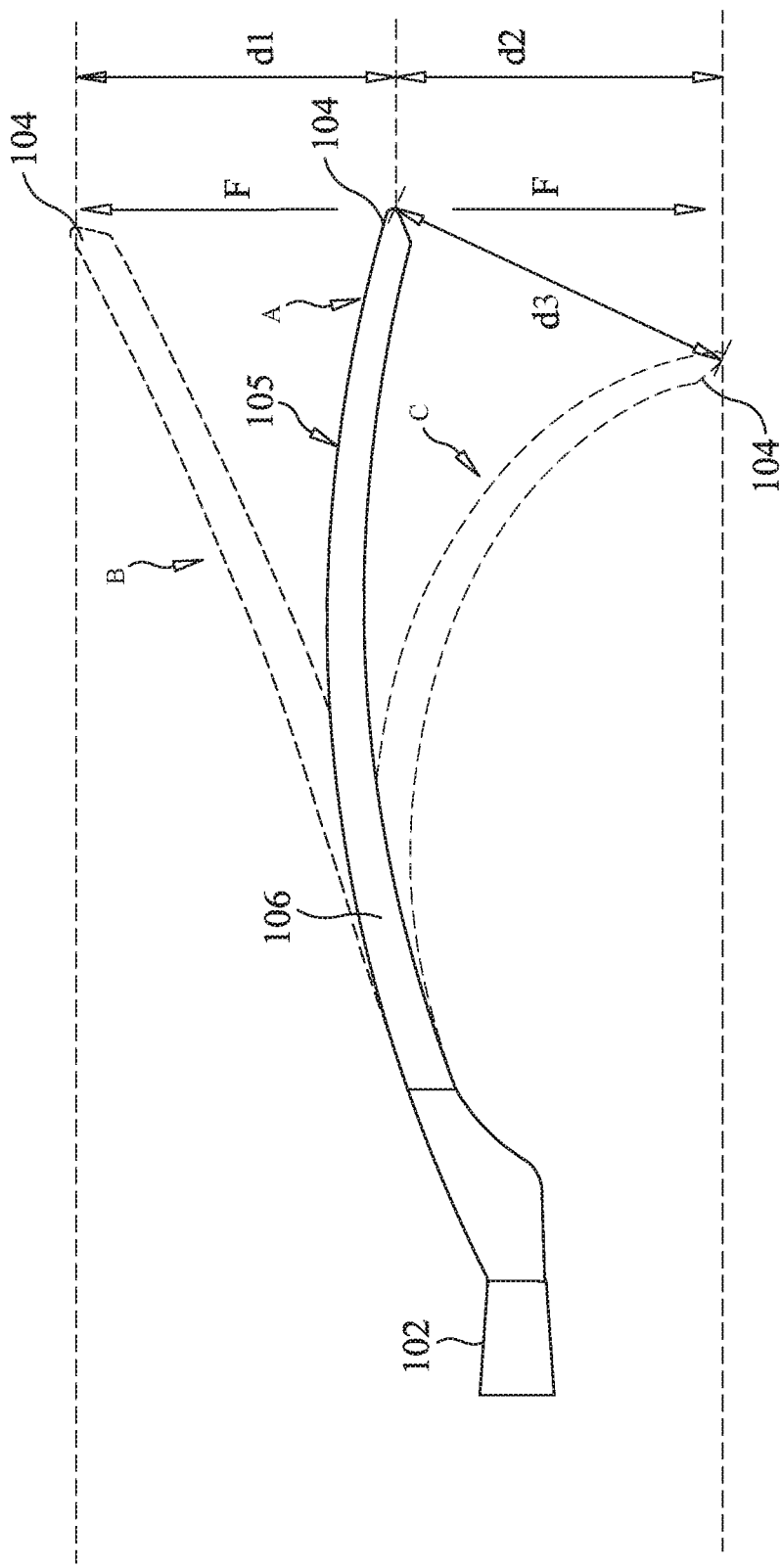
FIG. 7 depicts a resistance difference between an inward deflect and an outward deflection of an arced tine.

An arced tine 105, as further depicted in FIG. 7, may comprise a base 102, and arced flexible member 106, and a tip 104. The base 102 may be situated at a proximal end of the arced flexible member 106. The base 102 may be connected and/or connectable to the lower portion of the handle 110. The tip 104 may be situated at a distal end of the arced flexible member 106.

The arced tines arc inwardly with respect to a center of the lower portion of the handle 110, although it should be understood that the arc could be oriented outwardly, radially, or in another suitable configuration in further embodiments. The arced flexible member 106 has an elongated arced profile between the base 102 and the tip 104. The length of the tines may vary depending on upon application. An example range may include lengths of about 1 to 4 inches (e.g., with a variance of 10-20%), although other variations are also possible and contemplated, such as when dealing with rough fibers that are highly course, tangled, etc., in which case the thicknesses and/or the length of the tines may be suitably increased proportionally to the usage requirements. The amount of curvature of the arced flexible member 106 may vary based on application.

An arced tine 105 is configured to be bendable various different directions relative to a rest position, such as position A depicted in FIG. 7. For example, an arced tine 105 may be bendable inwardly, outwardly, as well as laterally in either direction, or in a direction in-between the foregoing. The arced flexible member 106, which extends from the base 102 to the tip 104 provides the arced tine 105 with its flexibility/bendability. As shown, the arced flexible member 106 is tapered in thickness from the base 102 to the tip 104, where a thickness of each arced tine proximal the base is thicker than a thickness of the arced tine proximal the tip. In other words, the thickness progressively decreases when moving from the base 102 to the tip 104. This advantageously allows the flex in the arced tine 105 to occur away from the base 102, for example in an area within the central or distal region of the arced flexible member 106, thus reducing stress and strain from occurring at or substantially near the point at which the arced tine 105 is connected to the handle 110, which differentiates the arced tine 105 from prior solutions that have substantially rigid teeth or bristles that, when bent, eventually break at or near the point of attachment to the handle. By way of example and not limitation, an arced tine 105 may be flexed from a natural position such that the flexible member bends inwardly or outwardly at least 90° such that the tip 104 is situated inwardly or outwardly perpendicular relative to the base 102, although it should be understood that greater or lesser angles may be accomplished depending upon material selection, use case, and/or other factors. Further, the range of motion in the direction of curvature may be greater than the range of motion opposite the direction of curvature.

The thickness of arced flexible member 106 may be varied depending on application to bend with certain profiles and/or at certain points or regions along the arced flexible member 106. Further, the thickness of the arced flexible member 106 may be determined based on the amount of force expected to be applied during use, such that the tip 104 of the arced tine 105 can be configured to move within a certain range during use. The cross-sectional shape of the arced tine shown is a dome-like where the outwardly-facing surface is rounded and the inwardly facing surface is substantially flat, which contributes to the variable flexibility of the arced tine. However, depending on the variable flexibility and/or aesthetic being sought, any other suitable shapes are also contemplated and encompassed hereby (e.g., round, triangular, oval, polygonal, smooth, etc. Further, the surfaces of the arced tine may be smooth, ribbed, textured, and/or otherwise formed to have any desired functional and/or textual characteristics that are consistent with the object of detangling, texturing, and combing the fibers.

FIG. 7 depicts an example resistance difference between an inward flexing and an outward flexing of an arced tine 105. In some embodiments, the arced flexible member 106 of an arced tine 105 has a stronger tine resistance when flexed outwardly than inwardly, although in reversed configurations the opposite could be true.

As shown, the arced tine 105 may be shaped to have a natural, resting profile as shown in position A. During use, the arced tine 105 is flexed in different directions, such as outwardly to position B, and inwardly to position A. When flexed inwardly, the elongated arced profile of the arced flexible member 106 of the arced tine 105 is accentuated, and when flexed outwardly, the elongated arced profile of the arced flexible member decreases, is eliminated, or is inverted depending on the amount of force applied.

In some embodiments, the elongated arced profile of the arced flexible member 106 can cause the arced tine 105 to be variably flexible. For instance, when the arced tine 105 is flexed outwardly to Position B responsive to a certain amount of force F being applied, the tip 104 of the arced tine 105 is flexed a distance d1 relative to its location when the arced tine 105 is in position A. In contrast, when the same amount of force F is applied in the opposite direction (inwardly in this example), the arced tine 105 is flexed inwardly to position C, in which the tip of the arced tine 105 is flexed a distance d2 relative to its location when the arced tine 105 is in position A. In this example, distance d1 is greater than distance d2 due to the increase in resistance caused by the force being applied in the direction of opposing the curvature of the arced profile. Even more pronounced in this example is the distance measured tip to tip between positions A and C (e.g., d3), then the distance tip to tip between positions A and B.

In some embodiments, the elasticity of the material may vary depending on the material used and/or the application for the detangler. For instance, a particular material having a particular Young's modulus may be selected for a given application depending on the aggressiveness of that application in terms of the fibers being worked with, the state of the knotting, the amount of use and force to be used, such that the arced tines may maintain their natural elongated arced profile even being subject to heavy, frequent, and/or forceful use. Non-limiting example materials may be used for the handle 110 components and/or the arced time 105 components include thermoplastics, nylon, other suitable synthetic materials, steel, aluminum, other suitable metals, 3D printable materials, etc.

Referring again to FIGS. 1-5, the arced tines 105 may be connected to the lower portion of the handle 112. In some embodiments, the plurality of arced tines 105 may be connected to the lower portion 112 of the handle 110 according to various patterns. The patterns may form one or more internal spaces in which a grouping of knotted fibers (a knot) may be situated and work through using the tines forming the spaces. Example patterns include circular, elliptical (e.g., oval), square, triangular, rectangular, polygonal, smooth polygonal, etc., in which arced tines 105 are positioned around the periphery of the pattern and the interior of the pattern is a void though which fibers may be situated and/or pass through.

In some embodiments, a pattern may be situated along a periphery of the handle 110, and the periphery may extend around the lower portion 112 of the handle 110. For example, as shown, the handle 110 may be spherical in nature, a surface of the lower portion 112 may form at least a portion of the spherical handle 110, and a plurality of the arced tines 105, such as arced tines 105a, 105b, 105c, 105d, 105e, 105f, 105g, . . . 105n are connected via bases 102a, 102b, 102c, 102d, 102e, 102f, 102g, . . . 102n to the lower portion of the handle. The flexible members 106a, 106b, 106c, 106d, 106e, 106f, 106g, . . . 106n bases 102a . . . 102n are connected at a proximal end to the bases 102a, 102b, 102c, 102d, 102e, 102f, 102g, . . . 102n and include tips 104a, 104b, 104c, 104d, 104e, 104f, 104g, . . . 104n at distal ends thereof. In some cases, the periphery P may comprise a peripheral surface that extends along a circular path around the lower portion 112 of the handle 110, although other configurations are also possible and contemplated.

In some embodiments, the spacing between the tines may range between 0.25 inches and 2 inches, depending upon the application, although other tine spacing ranges are also applicable, such as those exceeding 2 inches or more industrial and/or animal uses. In an example embodiment for hair salons, the spacing between the tines may comprise about 0.5 inches, although other variations are applicable depending on hair types, lengths, textures, etc.

Figure 6:
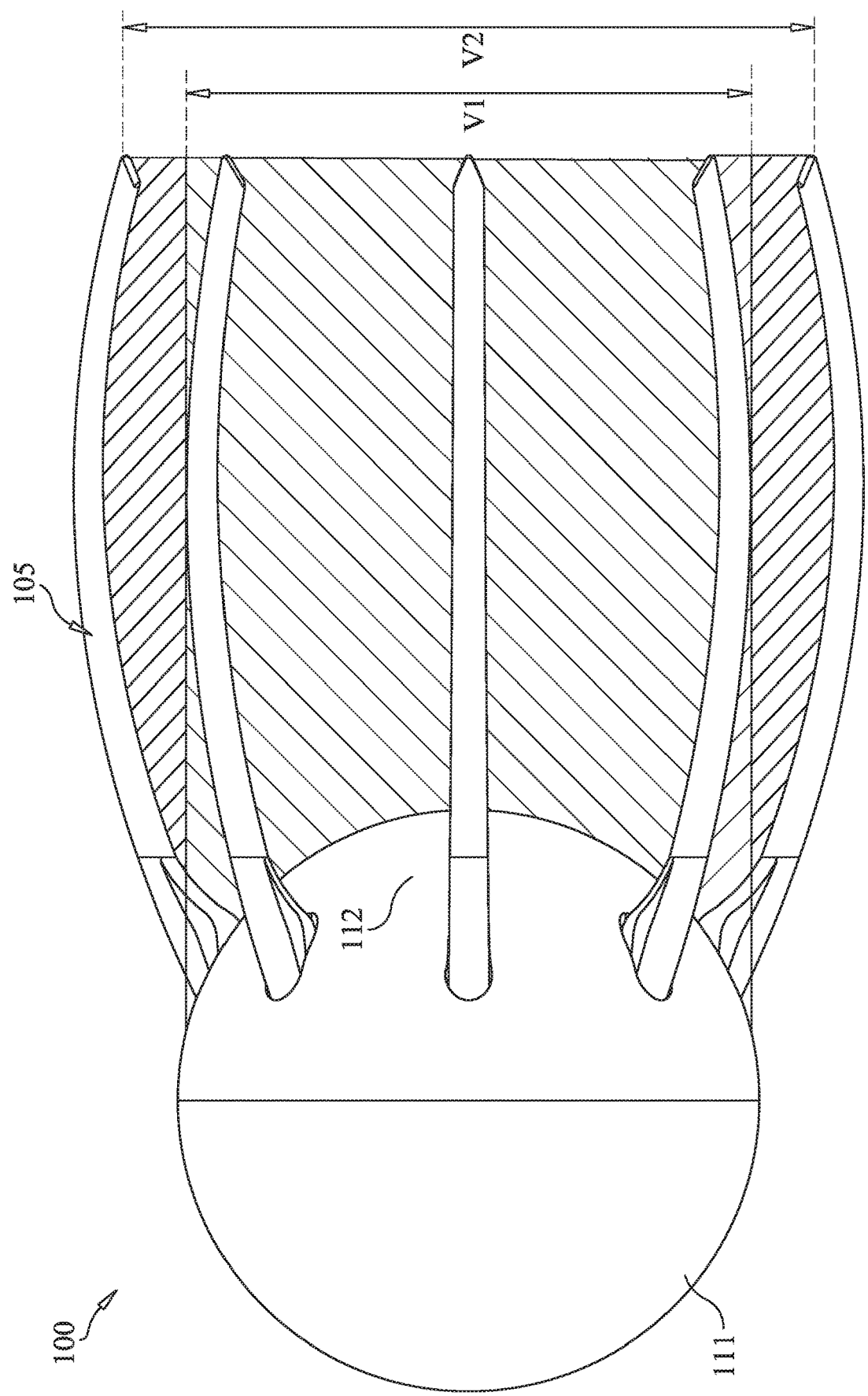
FIG. 6 depicts an interior volume difference between straight tines and example arced tines.

FIG. 6 depicts an interior volume difference between example arced tines and straight tines. As shown, since the arced tines 105 arc outwardly relative to the handle, volume V2 within the arrangement of art tines 105 is greater than a volume that could be obtained, as represented by V1, if straight tines were used and protruded perpendicularly outwardly from an outermost periphery of the handle (e.g., the lower portion 112). This advantageously allows for knots to be better accommodated within the space formed by the patterned arrangement of the arced tines 105, and then worked on by rotation and back-and-forth movement of the detangler 102, as described in further detail below with respect to FIGS. 11-14.

It should be understood that the embodiments described herein are not limited to a single periphery but may include a plurality of peripheries. For example, a first arrangement 1003 of arced tines 105 may be placed along an outer periphery and a second arrangement 1005 of arced tines 105 may be placed around the inner periphery, as depicted in FIG. 10, although it should be understood that other patterns, arrangements, and peripheries, and numbers of the forgoing (e.g., three or more, etc.) may be used in are contemplated. In some embodiments, one pattern of arced tines 105 may crossover another pattern of arced tines 105, such as intersecting circular patterns of arced tines 105. Advantageously, and these other arrangements, a predetermined distance may be maintained between all or portions of the arced tines 105 such that a suitable volume to accommodate knotted hair may be maintained without compacting the hair and exacerbating the knots like the prior solutions described in the Background.

Figure 4:
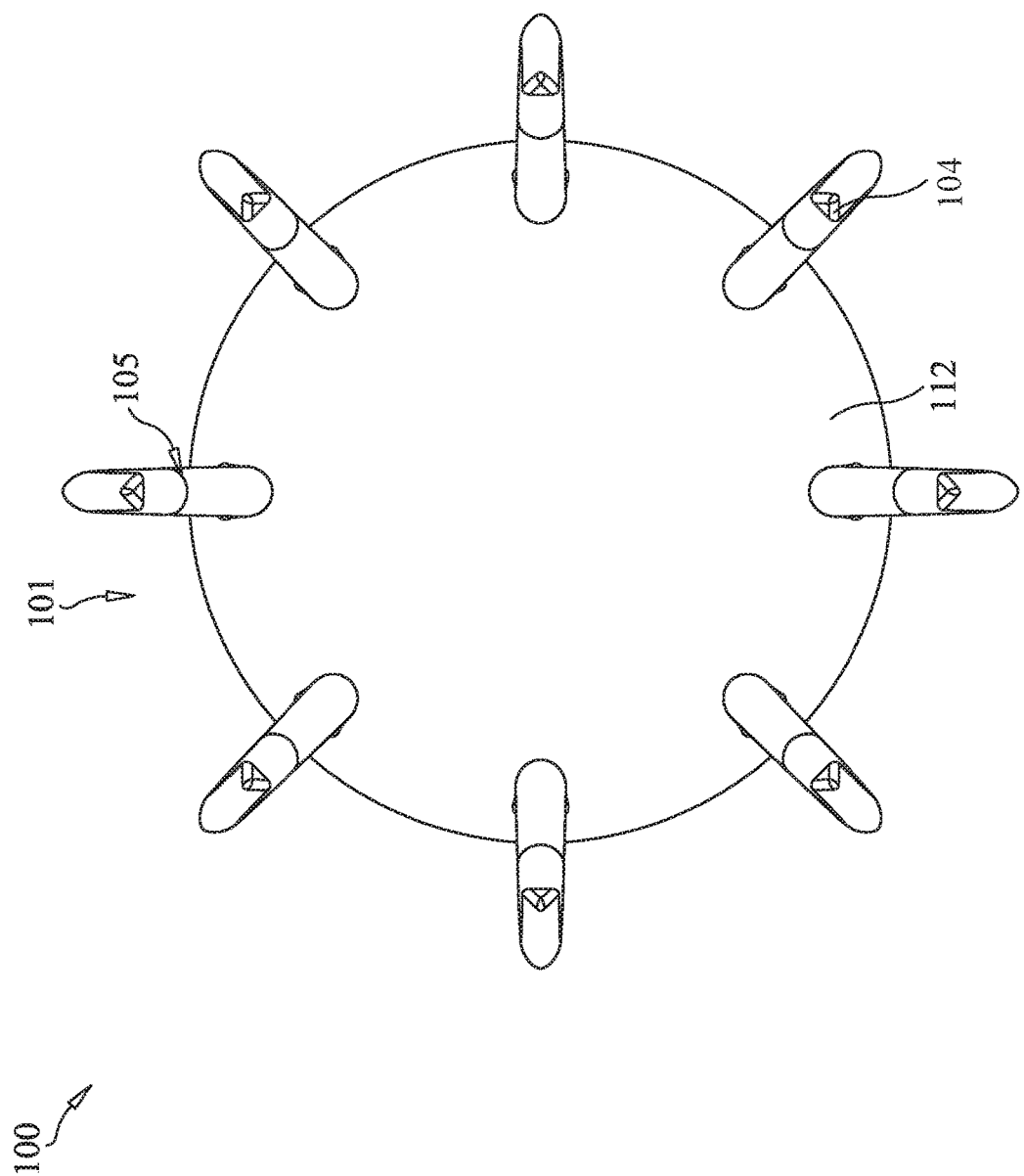
FIG. 4 depicts a rear view of the example detangling device.
Figure 5:
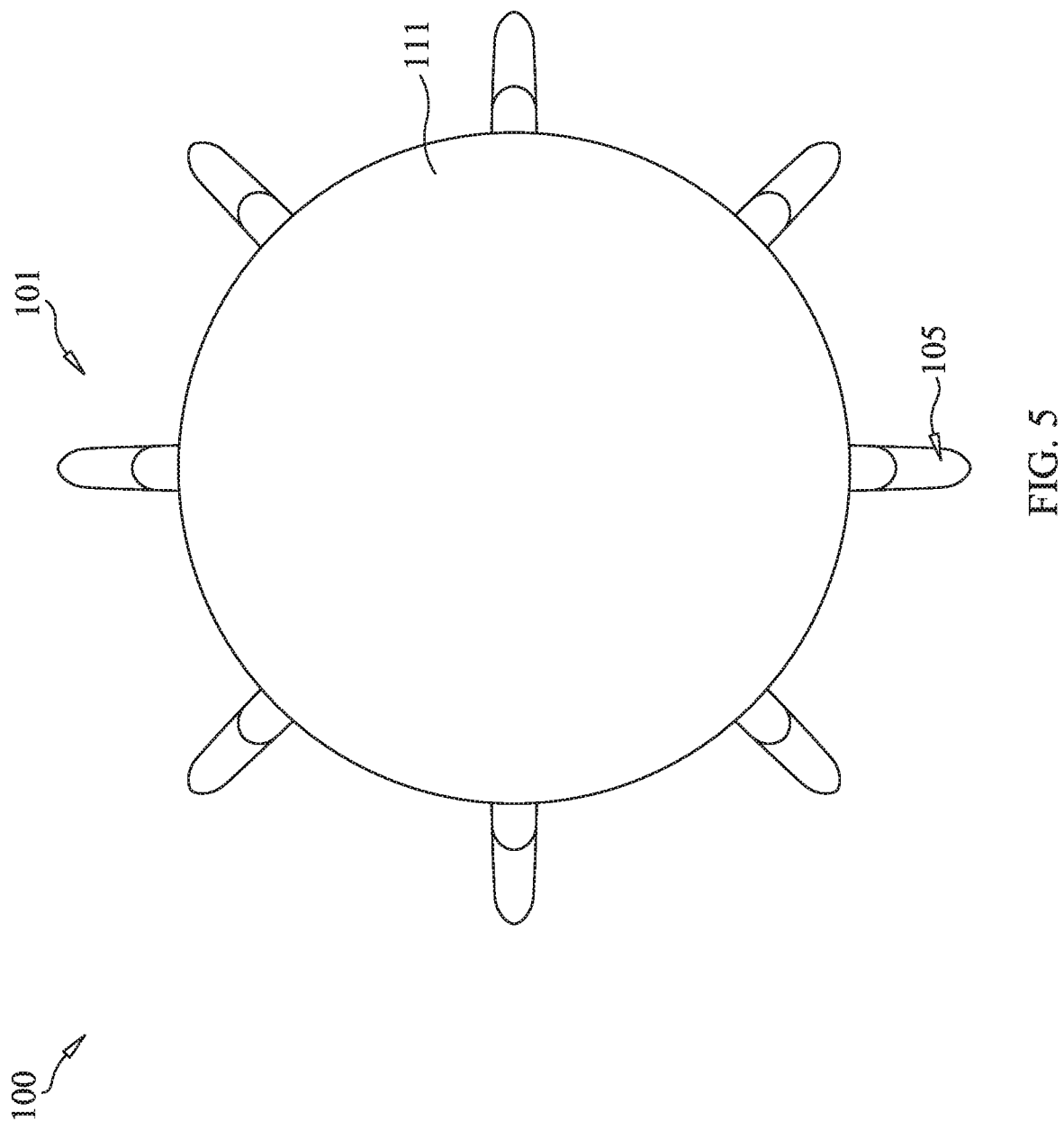
FIG. 5 depicts a front view of the example detangling device.

As shown, a tip 104 may have a triangular shape, as shown in further detail in FIG. 4, although it should be understood that the tip may have other shapes depending on the application, such as diamond shapes, oval shapes, circular shapes, pointed shapes, etc.

Figure 8:
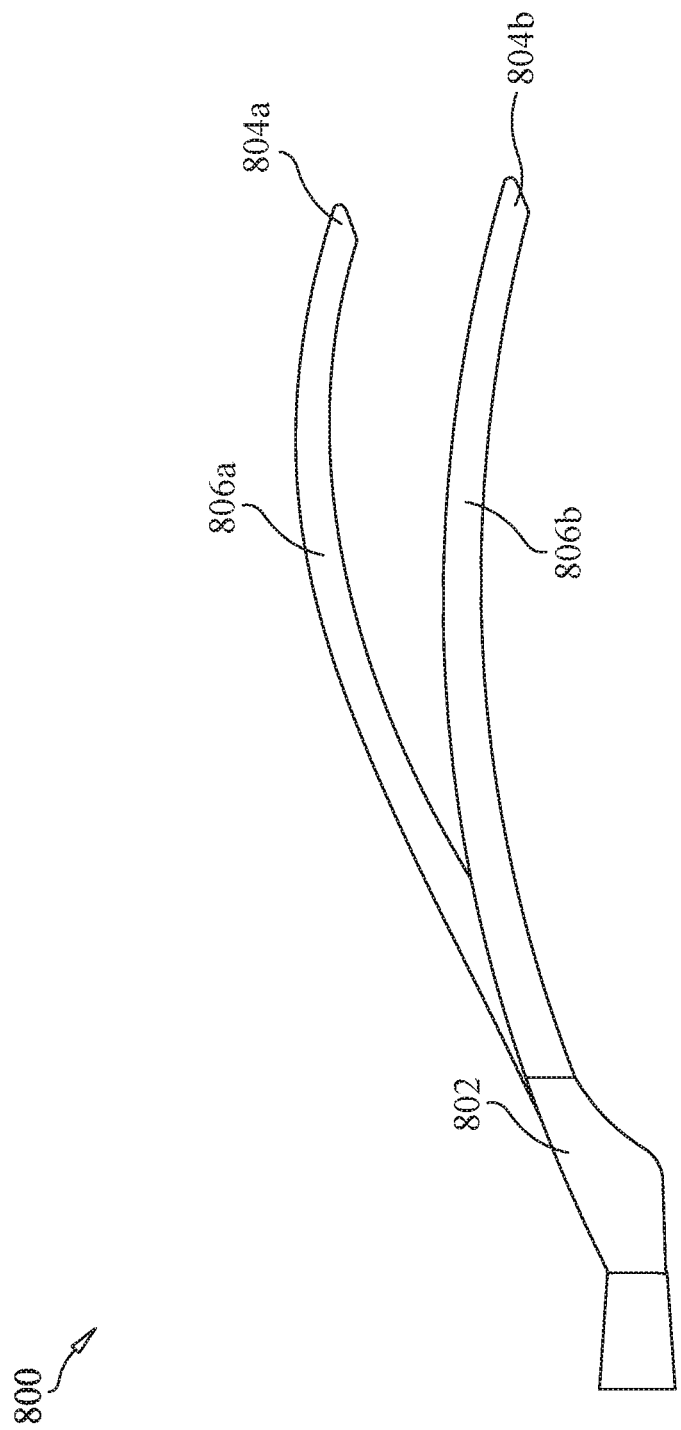
FIG. 8 depicts an example arced tine with multiple tips.

In some embodiments, an arced tine 105 may have more than one tip (e.g., two or more). FIG. 8 depicts an example arced tine 800 that includes two tips, 804a and 804b, at the ends arced flexible members 806a and 806b, respectively. In the depicted example, arced flexible members 806a and 806b may have the same properties as those described respect to arced flexible member 106, such as variable flexibility, a tapered arced profile, etc. This advantageously allows a detangling device 101 comprising a plurality of such example arced tines 800 to work out knots via the inner arced flexible member 806b while simultaneously combing through less knotted or unnoted hair via the outer arced flexible member 806a.

In some embodiments, the arced tines 105 may be securely attached to the handle 110 via a set of corresponding tine holders. The tine holders may be situated on exterior surface(s) of the handle 110, interior surfaces of the handle 100, a combination of the forgoing, etc.

FIGS. 9A-9D, which depict various views exposing example internal elements of the handle 110 of the example detangler shown in FIGS. 1-5. As shown, a plurality of tine holders 902 are situated on an interior of the handle 110. The base 102 of the arced tine 105 is compatibly shaped to mate with a corresponding tine holder 902.

As depicted, during manufacturing, the lower portion 112 of the handle 110 comprises a housing including an interior cavity. One or more interior surfaces of the housing collectively form the cavity. The one or more interior surfaces of the housing, which in this case comprises a concave surface having a plurality of protrusions which serve as a plurality of tine holders 902 that are configured to hold the plurality of arced tines 105. Beneath the plurality of tine holders 902 are a plurality of tine apertures 904 through which the plurality of arced flexible members 106 of the plurality of arced tines may protrude once inserted into the tine apertures. For example, during assembly, the tips 104 of the arced tines 105 may be guided through tine apertures until the plurality of bases 102 are seated in their respective tine holders 902.

Figure 9A:
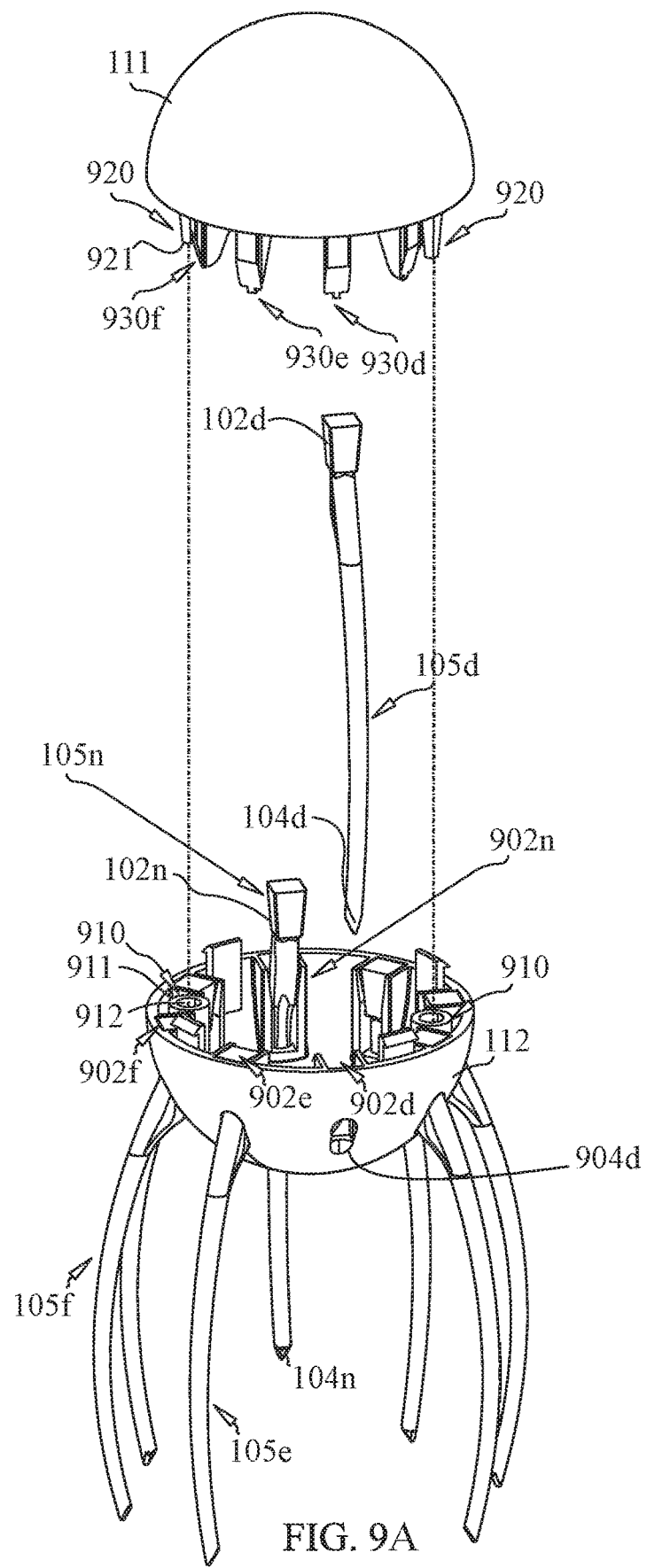
FIGS. 9A-9D depict various views exposing example internal elements of the detangler.

By way of further example, as shown in FIG. 9A, the tip 104d of arced tine 105d may be inserted into tine aperture 904d until the base 102d is seated into tine holder 902d. Similarly, arced tine 105n depicted as being partially inserted into its corresponding through aperture and approaching the point in which the base 102n will be mated with tine holder 902n.

In some embodiments, fastening the upper portion 111 of the handle 110 to the lower portion 112 of the handle 110 secures the arced tines 105 in place so that during use the arced tines 105 remain in place/do not become dislodged. For example, when the upper portion 111 is connected to the lower portion 112 of the handle 110, a plurality of retaining components included in the upper portion 111 respectively interact with the plurality of tine holders 902 included in the lower portion 112 to help securely retain the arced tines 105 in place via the bases 102 of the arced tines.

Figure 9B:
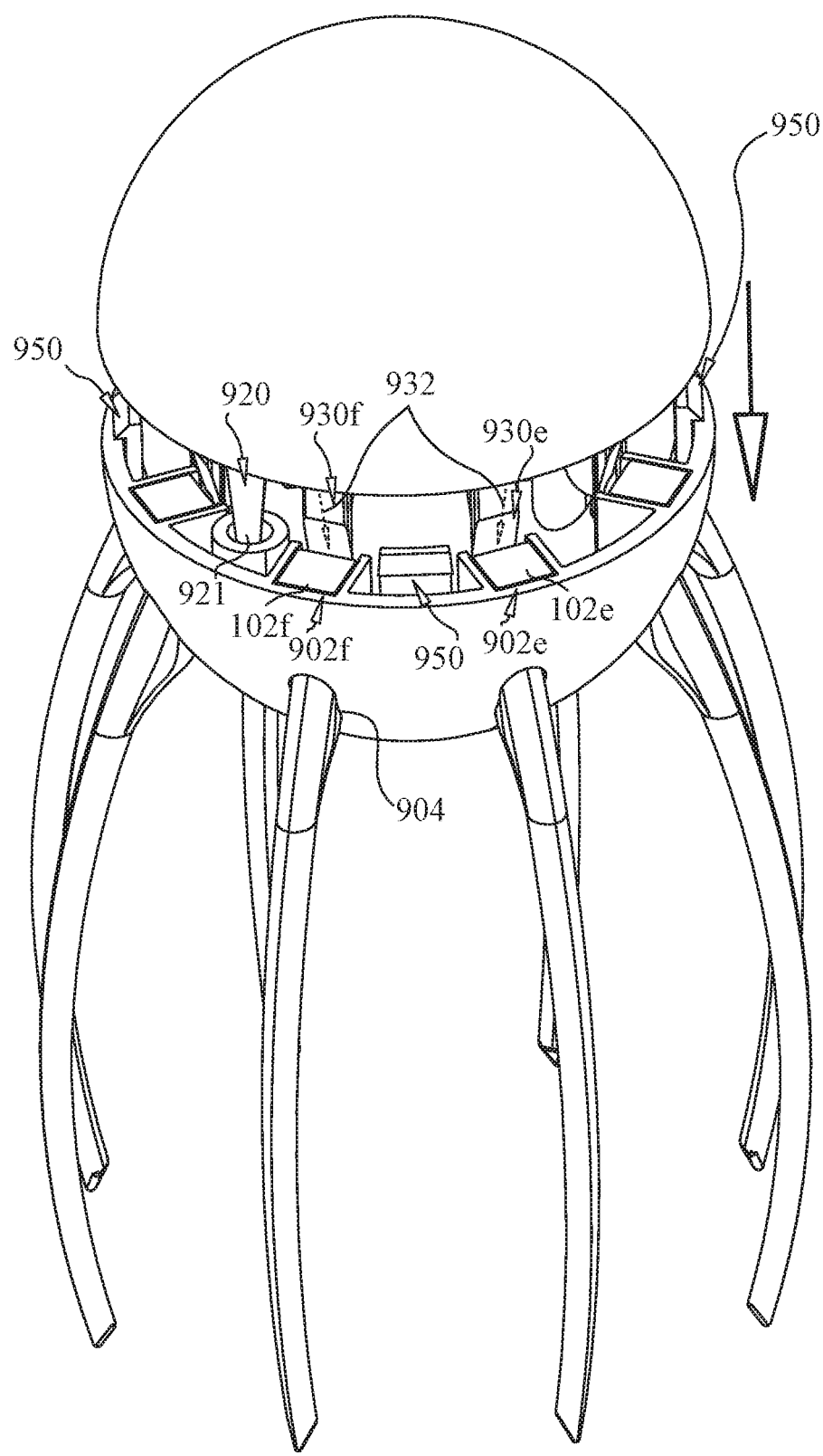
Figure 9C:
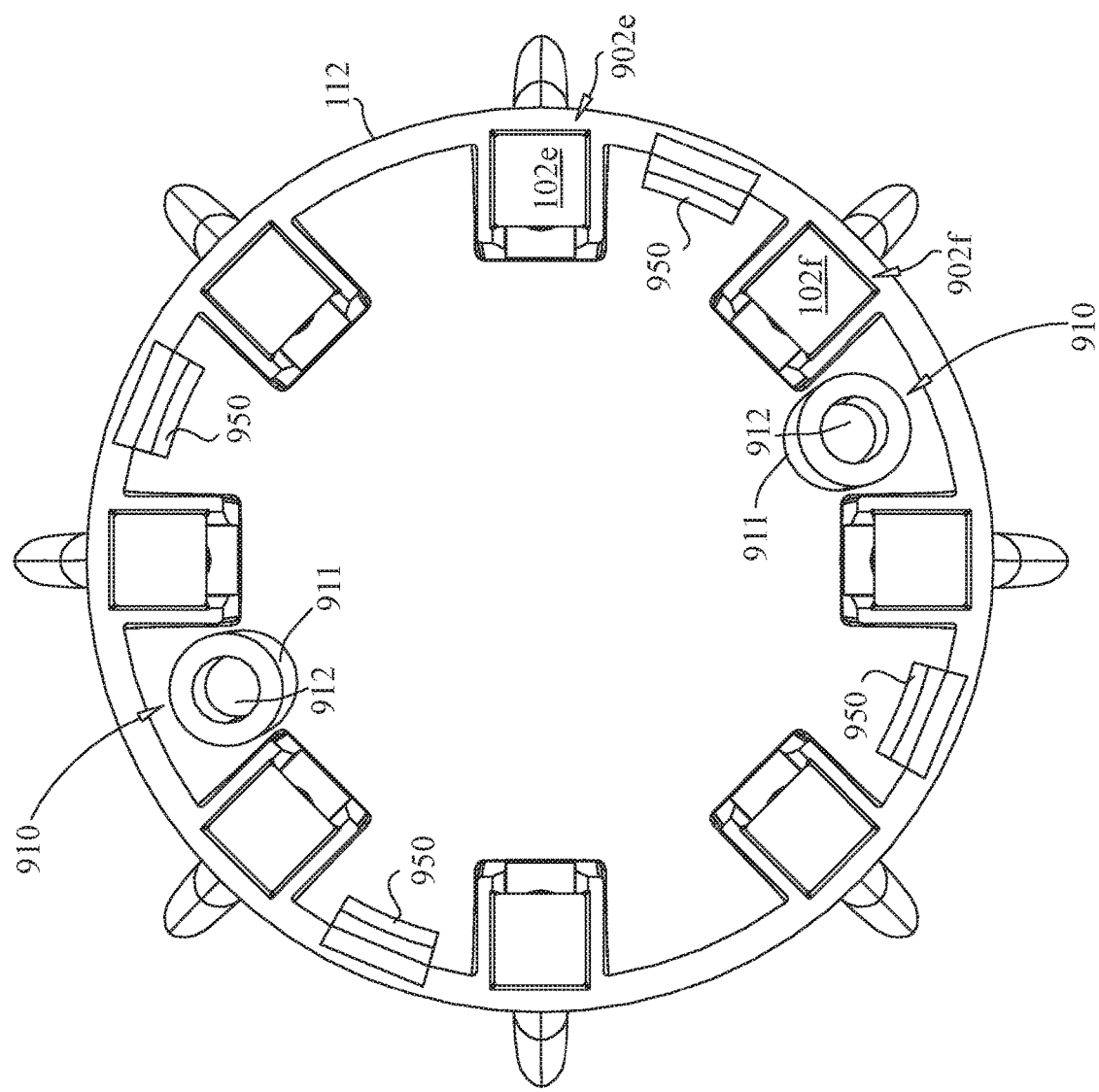
Figure 9D:
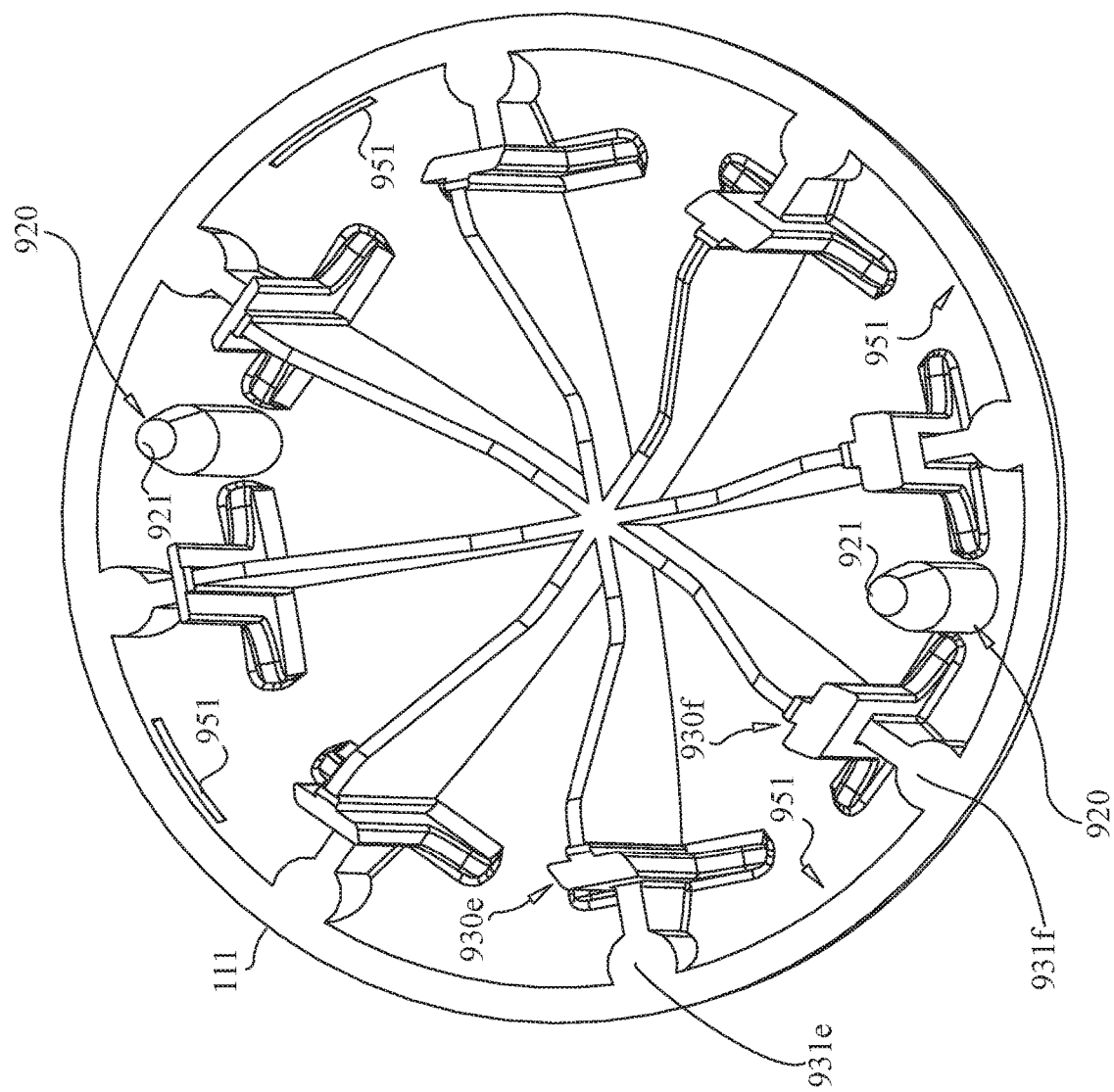

In some embodiments, the lower portion 112 of the handle 110 comprises a plurality of tine retainers 930 situated proximal to the first periphery. The base 102 of each arced tine 105 may be coupled to a corresponding tine retainer 930. For instance, with reference to the components labeled with the suffixes "f" and "d" in FIGS. 9A-9D, a further illustrative example is provided. The upper portion 111 of the handle 110 they comprise housing that includes a plurality of tine retainers 930e, 930f, etc. (also simply referred to individually or collectively as 930), which correspond to the plurality of tine holders 902 (e.g., 902e, 902f, etc.). The plurality of tine retainers 930 may be situated in a region on the internal side of the housing (referred to herein in some instances as the lower handle attachment region) that is configured to face the lower portion 112's housing when coupled together to form the handle 101. As shown in FIGS. 9A, 9B, and 9D, the plurality of tine retainers 930, such as 930e, and 930f, protrude outwardly past a boundary formed by an outer ridge of the upper portion 111, so that when the upper portion 111's housing is coupled with the lower portion 112's housing, the plurality of tine retainers 930, e.g., 930e, 930f, correspondingly coupled with the plurality of tine holders 902, e.g., 902e, 902f, to cooperatively secure the plurality of arced tines 105 in place. More particularly, as shown in FIG. 9B, as the upper portion 111 is coupled to the lower portion 112 as demonstrated by arrows 932, an slanted, inwardly facing surface of the tine retainer 930e contacts an inwardly facing surface of the base 102e, thereby guiding the base 102e in place and securely retaining it within the tine holder 902e once the upper portion 111 and the lower portion 112 are coupled. Similarly, tine retainer 930f guides and retains the base 902f. As shown in FIG. 9D, the tine retainers 930, such as tine retainers 930e and 930f, include upper retaining surfaces 931e and 931f to prevent vertical movement of the arced tines 105 during use, such as preventing them from sliding up into the upper portion 111's housing.

The upper portion 111 in the lower portion 112, when coupled, may be fastened to another using any suitable fastener, such as mechanical fastener(s) (e.g., screw(s), snaps, clips, male/female connectors, etc.), adhesives, strong magnets, etc. The some embodiments, the upper portion 111 in the lower portion 112 may include compatible alignment components comprising an alignment mechanism that properly aligns the tine retainers 930 of the upper portion 111 with the tine holders 902 of the lower portion 912 for convenient and efficient manufacturing.

As depicted, the upper portion 111 may include a plurality of studs 920 that protrude outwardly from the rim of the housing of the upper portion 111, in the lower portion 112 may include in an interior of its housing corresponding stud receivers 910 there compatibly positioned and shaped to receive the studs 920 of the upper portion 111. As the upper portion 111 and lower portion 112 or coupled, an assembly machine or human assembler, may align the studs 920 with the stud receivers 910, once aligned, may press the upper portion 111 lower portion together such that the respective fasteners a couple and securely fasten the upper portion 111 and the lower portion 112 together. Upon doing so, the shafts 921 of the studs 928 be inserted into the corresponding holes 912 formed in the top surfaces of the receivers, which prevents the upper portion 111 from rotating relative to the lower portion 112 once coupled.

In the depicted embodiment, the upper portion 111 includes a plurality of female fastening components 951, and the lower portion 112 may include a plurality of corresponding male fastening components positioned in locations in the lower housing that correspond to the positions of the upper housing in which the female fastening components are situated 950, although it should be understood that the male and female fasteners may be reversed, alternated, or that any other suitable fasteners may be used as discussed elsewhere herein.

Figure 11:
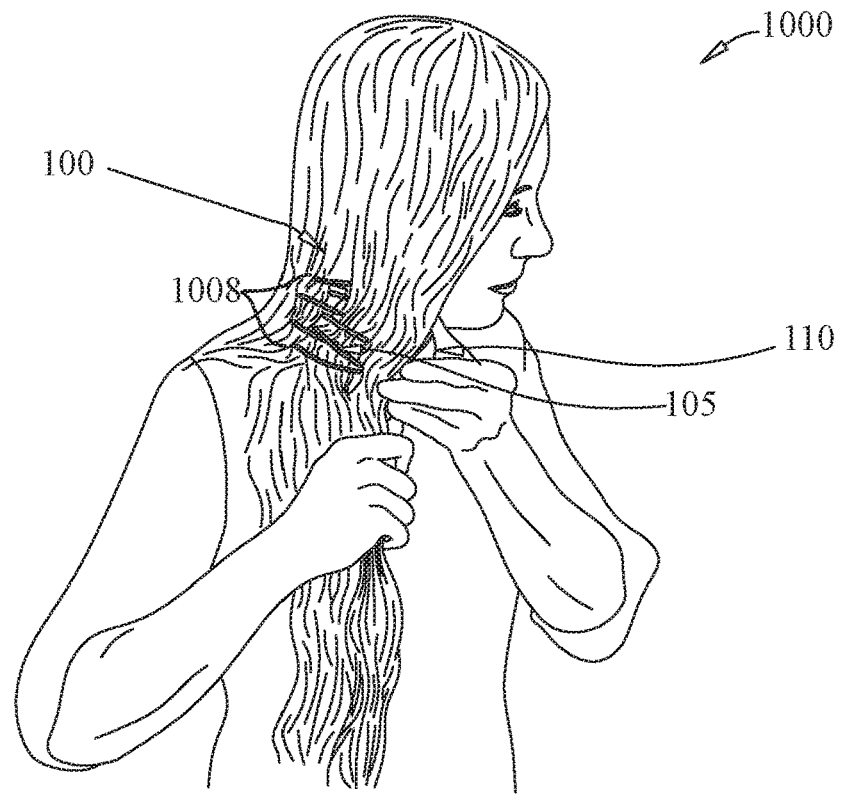
FIGS. 11-14 depict example positioning and/or movement of the detangler of at least FIGS. 1-5.

FIGS. 11-14 depict various positioning and/or movement of an example detangler 100. As shown in FIG. 11, the user 1000 may hold the detangler 100 by the handle 110 at an upward angle and work through his/her hair, for instance, working in a downward manner to unravel the tangle or knot with less stress on the hair. Such a motion leverages the flexibility of the arced tines, their spacing, and/or the volume contained between the patterned arrangement of tines, to achieve quicker and more fluid release of the knots in the user 1000's hair. This motion can be repeated continuously and/or combined with twisting, back-and-forth, and/or up-and-down motions as is needed to quickly work out the knots in the user 1000's hair, as well as add volume by fluffing or teasing the hair.

The user 1000 can grip the handle 110 of the detangler 100 securely with their fingers while having a wide range of motion to move his or her wrist freely. This enables the user 1000 to apply the arced tines 105 to the hair various different positions, such as upward, downward, etc. The user 1000 can traverse his/her hair in sections using emotions described herein until the hair is successfully detangled.

Figure 12:
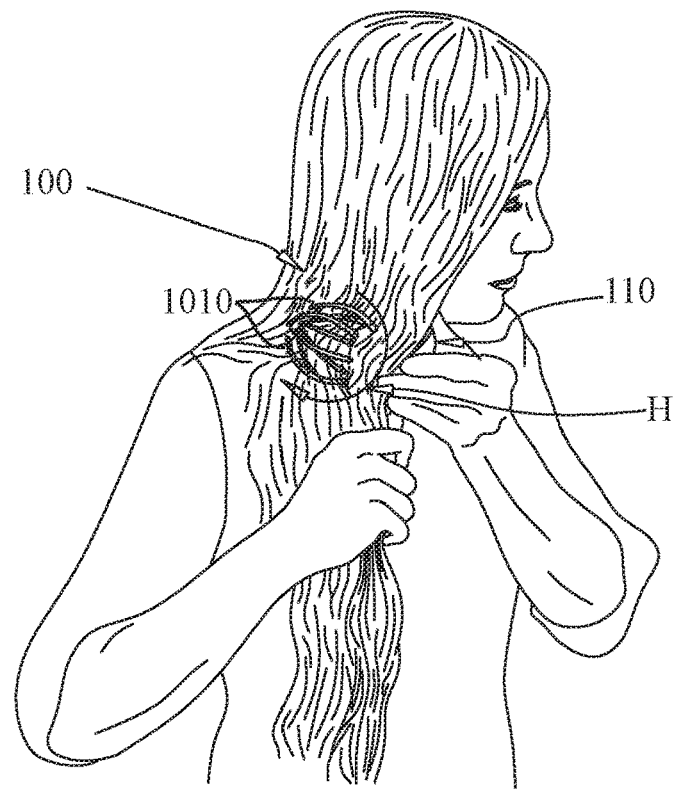

The arced tines 105 of the detangler 100 are advantageously torsionally flexible, as well as laterally, an inwardly and outwardly flexible. This allows a user 1000 to twist the detangler when inserted into a knotted region of hair, as well as apply back-and-forth movement to flex the arced tines 105 laterally, inwardly, and outwardly, more quickly work out the knot, instead of compacting the knot like prior solutions such as those described in the Background. As shown in FIG. 12 in particular, when twisting the handle 110 of the detangler 100 (e.g., 360 degrees) as shown by arrow H, the arced tines 105 elastically deform as shown by reference number 1010, thus rotationally compacting the tips 104 together and temporarily reducing the volume between the arced tines 105, and when untwisting the handle 110, the arced tines 105 resume their original arced shape, which expands the volume between the arced tines 105 as shown by reference number 1008, allowing the knotted areas to release. When performed in's cycles alternating between twisting motion and back-and-forth motion, the variable resistance, the expansion and contraction of the internal volume, and the twisting of the arced flexible members 106 of the arced tines 105, can even more efficiently eliminate knots.

By way of further example, an arced flexible member 106 of each arced tine may be comprised of a material having a torsional modulus of elasticity such that when the handle 110 is twisted 360 degrees, the arced flexible member of each arced tine is twistable at least 90 degrees between the base 102 and the tip 104 without resulting in permanent deformation. Rather, when released, the arced flexible member 106 eventually resumes its original shape. In some cases, the arced tine may be configured to be twistable more or less than 90 degrees by selecting a suitable profile and/or material for a given objective, and as such, other ranges of motion are also possible and contemplated (e.g., 15 degrees to 360 degrees plus).

Figure 13:
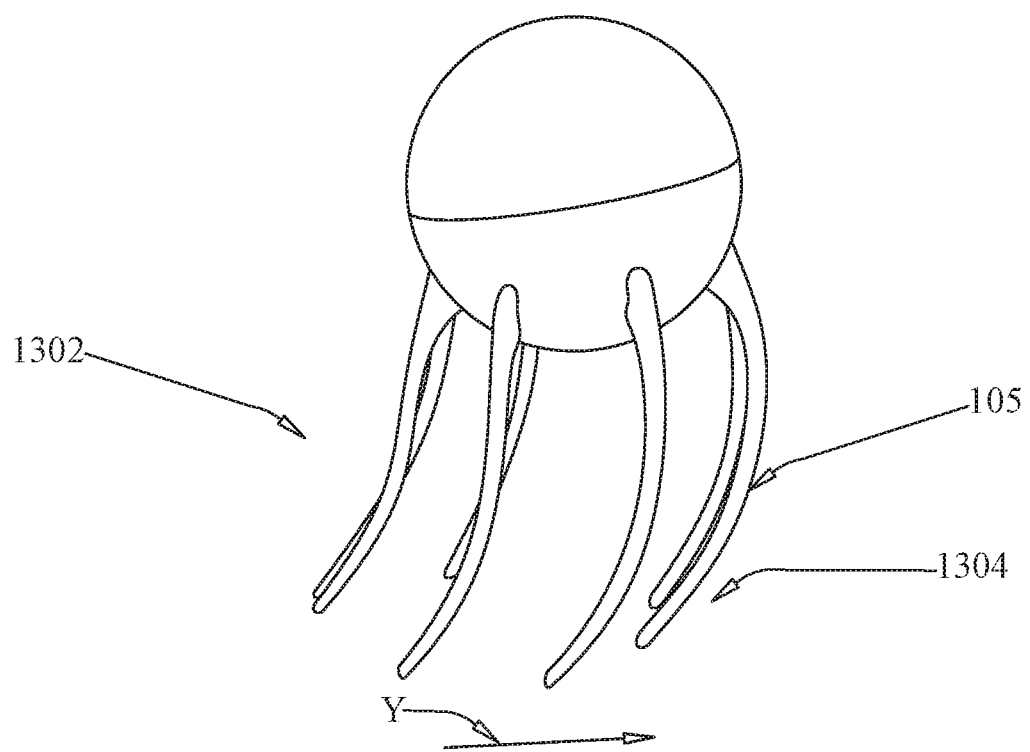
Figure 14:
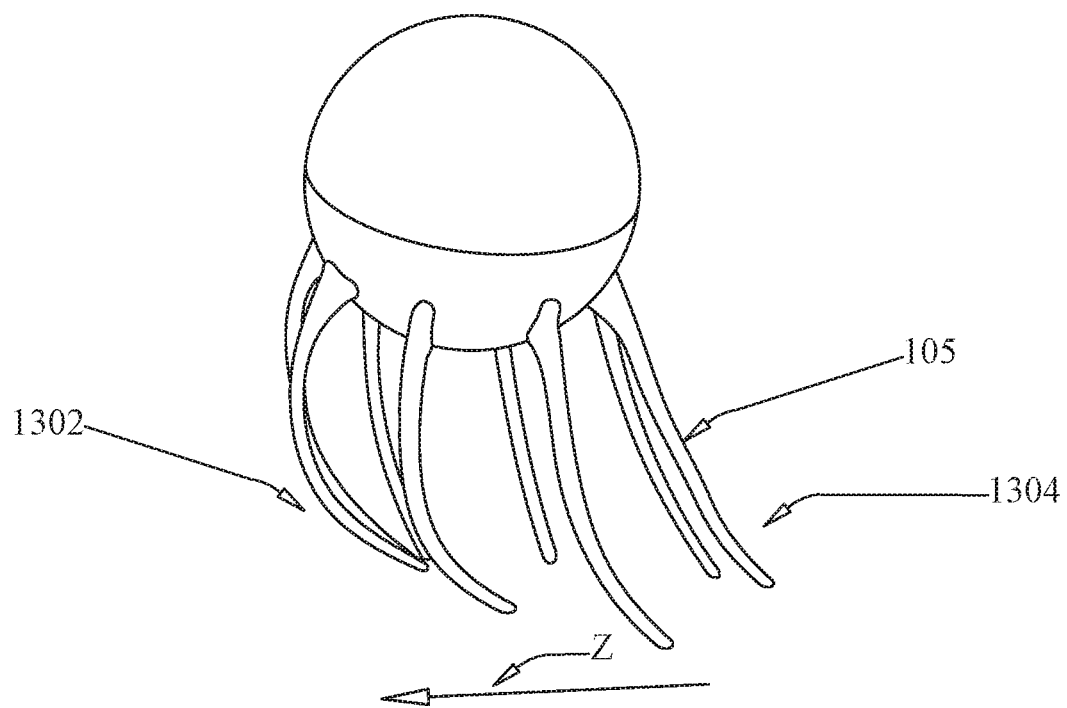

FIGS. 13 and 14 portray how back-and-forth wrist movements of the detangler 100, can flex the arced tines 105 when inserted into a bunch of fibers, such as hair or fur. For instance, when inserted into a tangled bunch of fibers, the plurality of arced tines 105 of the detangler 100 are capable of penetrating through the tangled bunch of fibers, and when moved in a first direction (direction Y) perpendicular to a direction of insertion into the tangled bunch of fibers, a first portion 1304 of the arced tines 105 flex inwardly, which accentuates the elongated arced profile of the arced flexible member 106 of each of the arced tines 105 of the first portion 1304, and a second portion 1302 of the arced tines 105 of the plurality of arced tines flex outwardly, which one of decreases, eliminates, and inverts the elongated arced profile of the arced flexible member 106 of each of the arced tines 105 of the second portion 1302.

Conversely, when moved in a second direction (direction Z) opposite to the first direction, the deflection of the first portion 1304 and the second portion 1302 of the arced tines 105 his reverse, such that the arced profiles of the arced flexible members 106 of the arced tines 105 of the second portion 1302 are restored and then accentuated, while the previously accentuated arced profiles of the arced flexible members 106 of the arced tines 105 of the first portion 1302 are decreased, eliminated, and/or inverted due to those arced tines 105 now being flex outwardly responsive to the movement in the second direction.

In some embodiments, the arced tines may be formed as individual members and attached to the handle 110. In some further embodiments, the arced tines 105 may be integral with the handle 110, such that the detangling device 100 is substantially monolithic. For example, the detangling device 100 may be formed using molding, such as thermoplastic injection molding.

FIG. 15 is a flowchart of an example manufacturing method for manufacturing a detangler 100. In block 1501, the manufacturing method forms the handle having an upper portion and a lower portion, such as but not limited to the upper lower portions described elsewhere herein.

In block 1502, the manufacturing method forms a plurality of arced tines that are connected to the lower portion of the handle along the first periphery extending around the lower portion of the handle. In some embodiments, the arced tines arc inwardly with respect to a center of the lower portion of the handle. Each arced tine may comprise an arced flexible member 106, as described elsewhere herein. Additionally, depending on the configuration, each arced flexible member 106 may comprise a base 102 and the tip 104, as described elsewhere herein.

In some embodiments, forming the plurality of arced tines 105 comprises forming each of the arced tines 105 as individual members, and securely attaching the base 102 of each of the plurality of arced tines 105 to corresponding tine holder 902, which may be included in the lower portion 112 of the handle 110.

In some embodiments, forming the handle 110 comprises forming, as the lower portion 112, a first housing including cavity, an interior surface of the first housing including a plurality of tine holders 902 that are configured to hold the plurality of arced tines 105, respectively. Further, the base of each arced tine 105 may be mated with a corresponding tine holder 902. The base 102 may be shaped to compatibly mate with the corresponding tine holder 902, and vice versa.

In some embodiments, the first housing may include a plurality of tine apertures 904 and the manufacturing method may further comprise passing the tip 104 of each arced tine 105 through a corresponding tine aperture 904 in conjunction with meeting the base 102 of each arced tine 105 with the corresponding tine holder 902.

In some embodiments, forming the handle may further comprise forming, as the upper portion 111, a second housing including a plurality of tine retainers 930 along a lower handle attachment region of the upper portion 111. The plurality of tine retainers 930 may protrude outwardly from the lower handle attachment region. The method may further comprise coupling the second housing with the first housing described above, such that the plurality of tine retainers 930 protrude into the cavity of the first housing and couple with the plurality of tine holders 902 cooperatively secure the plurality of arced tines 105 in place.

The foregoing description, for purpose of explanation, has been described with reference to various embodiments and examples. However, the illustrative discussions above are not intended to be exhaustive or to limit the invention to the precise forms disclosed. Many modifications and variations are possible in view of the above teachings. The various embodiments and examples were chosen and described in order to best explain the principles of the invention and its practical applications, to thereby enable others skilled in the art to utilize the innovative technology with various modifications as may be suited to the particular use contemplated.

What is claimed is:

1. A detangling device comprising:
   a handle having an upper portion and a lower portion; and
   a plurality of arced tines having bases connected to the lower portion of the handle along a first periphery extending around the lower portion of the handle, the plurality of arced tines arcing inwardly with respect to a center of the lower portion of the handle, each arced tine of the plurality of arced tines comprising:
      a variably-flexible arced member including an outwardly-facing surface on a first side and an inwardly-facing surface on a second side opposing the first side, the outwardly-facing surface having a profile that is different than the inwardly-facing surface to provide a variable flexibility;
      a base situated at a proximal end of the variably-flexible arced member, the base being connected to the lower portion of the handle; and
      a tip situated at a distal end of the variably-flexible arced member, the variably-flexible arced member having an elongated arced profile between the base and the tip.

2. The detangling device of claim 1, wherein each arced tine of the plurality of arced tines is tapered from the base to the tip, a thickness of each arced tine proximal the base being thicker than a thickness of the arced tine proximal the tip.

3. The detangling device of claim 1, wherein the lower portion of the handle comprises a plurality of tine retainers situated proximal to the first periphery, the base of each arced tine of the plurality of arced tines being coupled to a corresponding tine retainer of the plurality of tine retainers.

4. The detangling device of claim 1, wherein the plurality of arced tines and the lower portion of the handle are integral.

5. The detangling device of claim 1, wherein the first periphery comprises a peripheral surface that extends along a circular path around the lower portion of the handle.

6. The detangling device of claim 1, wherein the variably-flexible arced member of each arced tine of the plurality of arced tines is comprised of a material having a torsional modulus of elasticity such that when the handle is twisted 360 degrees, the variably-flexible arced member of each arced tine being twistable at least 90 degrees between the base and the tip without permanent deformation.

7. The detangling device of claim 1, wherein, when inserted into a tangled bunch of fibers, the plurality of arced tines are capable of penetrating through the tangled bunch of fibers, and when moved in a first direction perpendicular to a direction of insertion into the tangled bunch of fibers, a first portion of arced tines of the plurality of arced tines flex inwardly, which accentuates the elongated arced profile of the variably-flexible arced member of each of the arced tines of the first portion of arced tines, and a second portion of arced tines of the plurality of arced tines flex outwardly, which one of decreases, eliminates, and inverts the elongated arced profile of the variably-flexible arced member of each of the arced tines of the second portion of arced tines.

8. The detangling device of claim 7, wherein the fibers comprise one of hair and fur.

9. The detangling device of claim 1, wherein the bases of the plurality of arced tines are spaced from one another along the first periphery by a distance of at least one tine width of an arced tine.

10. An arced tine of a fiber detangler, comprising
    a variably-flexible arced member including an outwardly-facing surface on a first side and an inwardly-facing surface on a second side opposing the first side, the outwardly-facing surface having a profile that is different than the inwardly-facing surface to provide a variable flexibility;
    a base situated at a proximal end of the variably-flexible arced member, the base being attachable to a tine holder of a handle of the fiber detangler; and
    a tip situated at a distal end of the variably-flexible arced member, the variably-flexible arced member having an elongated arced profile between the base and the tip.

11. The arced tine of claim 10, wherein the arced tine is tapered from the base to the tip, a thickness of the arced tine proximal the base being thicker than a thickness of the arced tine proximal the tip.

12. The arced tine of claim 10, wherein the arced tine is comprised of a material having torsional modulus of elasticity such that the variably-flexible arced member is twistable at least 90 degrees without permanent deformation.

* * * * *